United States Patent
Sasaki et al.

(10) Patent No.: US 9,123,938 B2
(45) Date of Patent: Sep. 1, 2015

(54) NONAQUEOUS-ELECTROLYTE BATTERY

(75) Inventors: Hideki Sasaki, Mito (JP); Toru Kojima, Fukaya (JP)

(73) Assignee: Hitachi Automotive Systems, Ltd., Tokyo (JP)

( * ) Notice: Subject to any disclaimer, the term of this patent is extended or adjusted under 35 U.S.C. 154(b) by 189 days.

(21) Appl. No.: 13/817,752

(22) PCT Filed: Aug. 26, 2010

(86) PCT No.: PCT/JP2010/005249
§ 371 (c)(1),
(2), (4) Date: May 2, 2013

(87) PCT Pub. No.: WO2012/025963
PCT Pub. Date: Mar. 1, 2012

(65) Prior Publication Data
US 2013/0224570 A1    Aug. 29, 2013

(51) Int. Cl.
*H01M 4/133*    (2010.01)
*C01B 31/04*    (2006.01)
(Continued)

(52) U.S. Cl.
CPC ............... *H01M 4/133* (2013.01); *C01B 31/04* (2013.01); *H01M 4/587* (2013.01); *H01M 4/525* (2013.01); *H01M 10/0525* (2013.01); *H01M 2004/021* (2013.01); *Y02E 60/122* (2013.01); *Y02T 10/7011* (2013.01)

(58) Field of Classification Search
CPC ..................................................... H01M 4/133
USPC .............................. 429/211, 231.8, 163, 233.8
See application file for complete search history.

(56) References Cited

U.S. PATENT DOCUMENTS

| | | | |
|---|---|---|---|
| 2004/0234866 A1* | 11/2004 | Yamaguchi et al. | 429/326 |
| 2005/0069758 A1* | 3/2005 | Kitao et al. | 429/50 |
| 2009/0104530 A1* | 4/2009 | Shizuka et al. | 429/223 |

FOREIGN PATENT DOCUMENTS

| | | |
|---|---|---|
| JP | 9-102309 A | 4/1997 |
| JP | 2001-126760 A | 5/2001 |

(Continued)

OTHER PUBLICATIONS

JP,2006-228505 MT.*

(Continued)

*Primary Examiner* — Patrick Ryan
*Assistant Examiner* — Alex Usyatinsky
(74) *Attorney, Agent, or Firm* — Volpe and Koenig, P.C.

(57) ABSTRACT

The purpose of the present invention is to provide a nonaqueous-electrolyte battery that exhibits high charge/discharge performance, i.e. high input/output performance, over a long period of time. This nonaqueous-electrolyte battery, in which a nonaqueous electrolyte and a group of electricity-generation elements that each have a positive electrode, a negative electrode, and a separator that isolates said positive electrode and negative electrode are sealed inside a battery case, is characterized in that the negative electrodes contain graphite having an edge/surface ratio (fe), as defined by the following equation, of 0.03-0.1. $fe=(2B/La+T/d_{002})/(2B/d_{100}+T/d_{002})$. In this equation, B represents the mean grain diameter of the graphite, T represents the grain thickness, La represents the a-axis crystallite size, $d_{002}$ represents the spacing between (002) planes, and $d_{100}$ represents the spacing between (100) planes.

2 Claims, 2 Drawing Sheets

(51) Int. Cl.
*H01M 4/587* (2010.01)
*H01M 10/0525* (2010.01)
*H01M 4/02* (2006.01)
*H01M 4/525* (2010.01)

(56) References Cited

FOREIGN PATENT DOCUMENTS

| | | | |
|---|---|---|---|
| JP | 2005-317469 A | 11/2005 | |
| JP | 2006-228505 A | 8/2006 | |
| JP | 2009-259502 A | 11/2009 | |
| JP | 2010-108771 A | 5/2010 | |

OTHER PUBLICATIONS

Zaghib et al., Effect of Graphite Particle Size on Irreversible Capacity Loss, Journal of the Electrochemical Society, 147 (6) pp. 2110-2115 (2000).

* cited by examiner

NONAQUEOUS-ELECTROLYTE BATTERY

TECHNICAL FIELD

The present invention relates to a nonaqueous-electrolyte battery.

BACKGROUND ART

A nonaqueous-electrolyte battery, for instance, a lithium ion battery which uses a nonaqueous electrolyte and is a secondary battery has a high energy density as compared to other secondary batteries such as a nickel-hydrogen battery and a lead storage battery, and accordingly is widely used in household electrical appliances such as personal computers and mobile phones. In addition, in recent years, the nonaqueous-electrolyte battery is used also in electric power tools, and has been developed also as an in-vehicle power source of an electric vehicle (EV) and a hybrid electric vehicle (HEV). Furthermore, a plug-in hybrid electric vehicle (PHEV) which also provides both modes of EV travelling and HEV travelling has received attention, and the nonaqueous-electrolyte battery has been developed also as an in-vehicle power source for PHEV.

The in-vehicle power source for the PHEV is required to have not only an energy density which is important for the EV travelling but also a high output and input performance which is important for the HEV travelling, i.e. high charge/discharge performance. In other words, the battery for this application is required to have both performances of the high energy density and the high input/output density.

A graphite-based material is used for the most part of a negative electrode material of the lithium ion battery. It is considered that mainly an edge surface of graphite contributes largely to charge/discharge reactions of the lithium ion battery which uses the graphite-based material for a negative electrode material (for instance, refer to Non-Patent Literature 1).

In addition, as for examples of means of enhancing the input/output performance of the battery, a technology of using a non-graphitizable carbon material in place of the graphite-based material for the negative electrode material is disclosed in Patent Literature 1, and a technology of reducing a resistance component of an electrode is disclosed in Patent Literature 2.

CITATION LIST

Patent Literature

Patent Literature 1: JP-A-2001-126760
Patent Literature 2: JP-A-2005-317469

Non Patent Literature

Non Patent Literature 1: K. Zaghib et al., "Effect of Graphite Particle Size on Irreversible Capacity Loss", Journal of The Electrochemical Society, 147 (6), and p. 2110 (2000).

SUMMARY OF INVENTION

Technical Problem

As has been described above, the nonaqueous-electrolyte battery, particularly, the secondary battery for PHEV application is required to have both of the high energy density and the high input/output density.

In order to enhance the input/output density of the battery and achieve the high input/output performance, it has been studied to use a non-graphitizable carbon material in place of the graphite-based material for the negative electrode. However, the non-graphitizable carbon material has a problem that the energy density of the battery becomes low, because of having a smaller capability of occluding/releasing a lithium ion than that of the graphite-based material.

In addition, there is means of reducing a resistance component of an electrode, and means of enlarging an area of an electrode and thereby lowering a current density, as a method of improving the input/output performance of the battery. However, the methods have a problem that the energy density of the battery becomes small, because when the area of the electrode is enlarged, a volume increases which is occupied by a material which does not contribute to the reactions of the battery such as a collector and a separator of the electrode.

In addition, there is means of enlarging a specific surface area of an electrode material, but when the specific surface area increases, the deterioration of the surface of the material progresses and the resistance component increases while having been used in a long period of time. Accordingly, the means has a problem that the so-called life performance of the battery degrades.

In light of the above described problems, the object of the present invention is to provide a nonaqueous-electrolyte battery that exhibits high charge/discharge performance, i.e., high input/output performance over a long period of time.

Solution to Problem

A nonaqueous-electrolyte battery for solving the above described problems has the following features. In a nonaqueous-electrolyte battery in which a group of electricity-generation elements such as a positive electrode, a negative electrode, and a separator that isolates the positive electrode and negative electrode, and a nonaqueous electrolyte are sealed inside a battery case, the negative electrode contains graphite having an edge surface ratio (fe) of 0.03 to 0.1, which is defined by the following equation. In the equation, B represents a mean grain diameter of the graphite, T represents a grain thickness, La represents an a-axis crystallite size, $d_{002}$ represents a spacing between (002) planes, and $d_{100}$ represents a spacing between (100) planes.

$$fe = (2B/La + T/d_{002}) / (2B/d_{100} + T/d_{002})$$

Advantageous Effects of Invention

According to the above described constitution, the nonaqueous-electrolyte battery can be provided which has the high charge/discharge performance, i.e. the high input/output performance over a long period of time.

DESCRIPTION OF EMBODIMENTS

Figure 1:
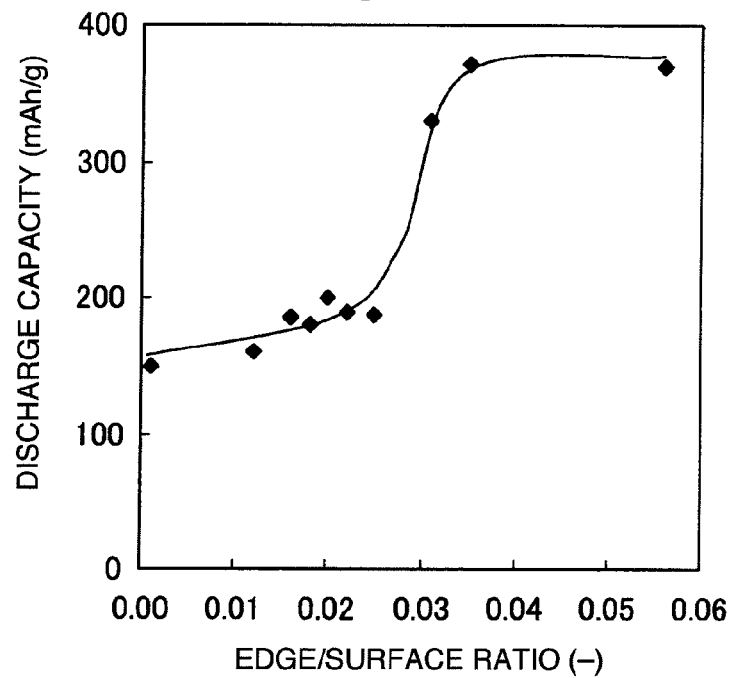
FIG. 1 is a view representing a relationship between an edge/surface ratio of graphite and discharge capacity, in a negative electrode of a nonaqueous-electrolyte battery.

An example of an embodiment of a nonaqueous-electrolyte battery according to the present invention will be described below. In the nonaqueous-electrolyte battery according to the present invention, graphite is used as an active material of the negative electrode. The graphite to be used may be any one of natural graphite and artificial graphite (mesophase microsphere, graphitized carbon fiber and the like), and its type is not limited. In the following example, the case will be described in which the natural graphite is used as the graphite.

(Evaluation of Negative Electrodes Containing Graphite)

In the evaluation of the negative electrode, a negative electrode of the nonaqueous-electrolyte battery was produced in the following way.

Natural graphite was pulverized by using a jet mill which was one type of an impact type pulverizer, while conditions such as temperature, period of time and strength were appropriately adjusted. After this, the natural graphite was subjected to a CVD treatment and thereby was covered with an amorphous carbon, in order to suppress a reaction of an edge surface with an electrolyte in initial charging. Thus, ten types of negative electrode materials (active materials of negative electrode) were produced in which pulverizing conditions were different.

An edge/surface ratio (fe) of the graphite was obtained for each produced negative electrode material. The edge/surface ratio (fe) is a quantity defined by the following equation (refer to Non-Patent Literature 1), and is a value of physical property which represents a thickness of a layer of graphite crystals.

$$fe = (2B/La + T/d_{002}) / (2B/d_{100} + T/d_{002})$$

Here, B represents a mean grain diameter of the graphite, T represents a grain thickness, La represents an a-axis crystallite size, $d_{002}$ represents a spacing between (002) planes, and $d_{100}$ represents a spacing between (100) planes.

The mean grain diameter B was obtained by measuring a grain size distribution of a graphite sample with a laser diffraction method. As for the grain thickness T, the mean value of the thicknesses was obtained by analyzing the image of an SEM photograph of the graphite sample. The a-axis crystallite size La was calculated by substituting a Raman measurement result of the graphite sample into the equation of $La = 44 \times ((I(1372)/I(1576))$. I(1372) and I(1576) are intensities at a spectrum of 1372 (/cm) and a spectrum of 1576 (/cm), respectively. The spacing $d_{002}$ between the (002) planes and the spacing $d_{100}$ between (100) places were obtained by calculation after the structure of the graphite sample was measured with an X diffraction analysis.

A mixture layer of the active material was produced by mixing 10 parts by weight of polyvinylidene fluoride (hereinafter abbreviated as "PVDF") functioning as a binder (binding material) with respect to 90 parts by weight of each of the negative electrode materials and a dispersing solvent of N-methylpyrrolidone (hereinafter abbreviated as "NMP"), and adjusting the viscosity. A rolled copper foil which is an electrode substrate and has a thickness of 10 μm was coated with the mixture layer of the active material. The resultant rolled copper foil was dried, then was pressed, and was cut so that the size of the portion which was coated with the mixture layer of the active material became 5 cm×5 cm, and thereby ten types of the electrodes for the test were produced. Each of the electrodes for the test has a portion in which the mixture layer of the active material was not provided in the upper portion thereof, and a lead wire was welded to this portion.

Each of the produced electrodes for the test was arranged so that metal lithium which had been cut into 5.1 cm×5.1 cm became a counter electrode through a separator made from polyolefin with a size of 6 cm×6 cm, and the components were immersed sufficiently in a nonaqueous-electrolyte solution. Thus, the ten types of cells for the test were formed. The nonaqueous-electrolyte solution was produced by dissolving 1 mol/l of $LiClO_4$ of an electrolyte into a solvent in which ethylene carbonate (EC) and diethyl carbonate (DEC) were mixed in a ratio of ethylene carbonate (EC):diethyl carbonate (DEC)=1:1 (volume ratio).

A cyclic charge/discharge test was performed by using this cell for the test and the result obtained is represented in FIG. 1. In the cyclic charge/discharge test, the cell for the test was subjected to a charge/discharge operation of 3 cycles in a range of 0 to 1.5 V, in which 372 mAh/g with respect to the weight of the negative electrode material was determined as a 1C rate, and then was subjected to a discharge operation at an 8C rate to 1.5 V. FIG. 1 is a view illustrating a relationship between the edge/surface ratio of graphite used in the negative electrode material and discharge capacity. It was proved from the result of the cyclic charge/discharge test that there was a correlation between the edge/surface ratio and the discharge capacity, as is illustrated in FIG. 1. In other words, it was found that when the edge/surface ratio was 0.03 or more, the discharge capacity was as large as 300 mAh/g or more, and an improving effect of the discharge performance at high rates was large.

In addition, when the edge/surface ratio exceeds 0.1, a capacity loss due to an irreversible reaction increases and the energy density of the battery decreases, as is described also in Non-Patent Literature 1. Accordingly, the edge/surface ratio is preferably in a range of 0.03 to 0.1.

In the negative electrode materials used in the electrode for the test, the edge/surface ratios of the graphite are different as is illustrated in FIG. 1. Details of the reason why the edge/surface ratios are different are unknown, but it is assumed that the edge/surface ratios are different due to the pulverizing condition of the graphite.

In addition, when the mean grain diameter of the graphite which is the negative electrode material exceeds 40 μm, it is difficult to produce an electrode to which the negative electrode material has been uniformly applied. Accordingly, the mean grain diameter of the graphite is preferably 40 μm or less. The mean grain diameter of the graphite is more preferably 30 m or less. However, when the mean grain diameter is small, a specific surface area of the active material of the negative electrode generally increases, adhesiveness between the active material of the negative electrode and the electrode substrate degrades, and the mixture layer of the active material occasionally exfoliates from the electrode substrate. Accordingly, the mean grain diameter of the graphite is more preferably 0.1 to 40 μm, and further preferably 0.1 to 30 μm.

(Evaluation of Battery Characteristics of Nonaqueous-Electrolyte Batteries)

Five nonaqueous-electrolyte batteries were produced for the evaluation of their battery characteristics. Out of these batteries, three batteries are nonaqueous-electrolyte batteries which were produced as examples, and the other two batteries are nonaqueous-electrolyte batteries which were produced as comparative examples. These five nonaqueous-electrolyte batteries were subjected to the evaluation of the battery characteristics, and initial performances (discharge capacity and output density) and maintenance factors (capacity maintenance factor and output maintenance factor) were determined.

Table 1 shows grain diameters, specific surface areas and edge/surface ratios (fe) of graphites which were used for the negative electrode materials of nonaqueous-electrolyte batteries that were subjected to the evaluation of the battery characteristics. In Table 1, Examples A to C represent graphites which were used in the negative electrodes of the nonaqueous-electrolyte batteries that were produced as examples, and Comparative Examples 1 and 2 represent graphites which were used in the negative electrodes of the nonaqueous-electrolyte batteries that were produced as Comparative Examples.

TABLE 1

Characteristics of graphite used in negative electrode of battery the characteristics of which were evaluated

|  | Grain diameter (nm) | Specific surface area (m$^2$/g) | Edge/surface ratio (fe) (−) |
|---|---|---|---|
| Example A | 9 | 8.9 | 0.030 |
| Example B | 13 | 2.7 | 0.035 |
| Example C | 24 | 1.7 | 0.056 |
| Comparative Example 1 | 7 | 2.9 | 0.016 |
| Comparative Example 1 | 7 | 9.8 | 0.025 |

Each of the negative electrodes was produced in the following way. Firstly, in a similar way to that in the above described evaluation of the negative electrode, natural graphite was pulverized with the jet mill while conditions such as temperature, period of time and strength were appropriately adjusted, and then was covered with amorphous carbon. Thereby, five types of negative electrode materials (active material of negative electrode) shown in Table 1 were produced. A mixture layer of the active material was produced by mixing 90 parts by weight of each of the negative electrode materials and 10 parts by weight of PVDF of a binder, with NMP of a dispersing solvent, and adjusting the viscosity. A rolled copper foil which was an electrode substrate and had a thickness of 10 μm was coated with the mixture layer of the active material. This rolled copper foil was dried and then was pressed, and a portion which was continuously formed in a longitudinal direction of the copper foil and had no mixture layer of the active material therein was left with a width of several millimeters, as a power collecting portion of the negative electrode. Thus, five types of the negative electrodes were produced.

The positive electrodes of the nonaqueous-electrolyte batteries were common to each of the negative electrodes, and were produced in the following way. A lithium metal oxide (LiNi$_{0.6}$Mn$_{0.2}$Co$_{0.2}$O$_2$) which mainly contains nickel was used as an active material of the positive electrode. A mixture was prepared by mixing 100 parts by weight of this active material of the positive electrode, 10 parts by weight of scaly graphite which functions as an electroconductive material and 5 parts by weight of PVDF of a binder, with NMP of a dispersing agent, and adjusting the viscosity. Then, an aluminum foil which is an electrode substrate and had a thickness of 20 μm was coated with the mixture. After that, the aluminum foil was pressed and the power collecting portion of the positive electrode was worked in a similar way to that in the negative electrode. Thus, the positive electrodes were produced.

Figure 2:
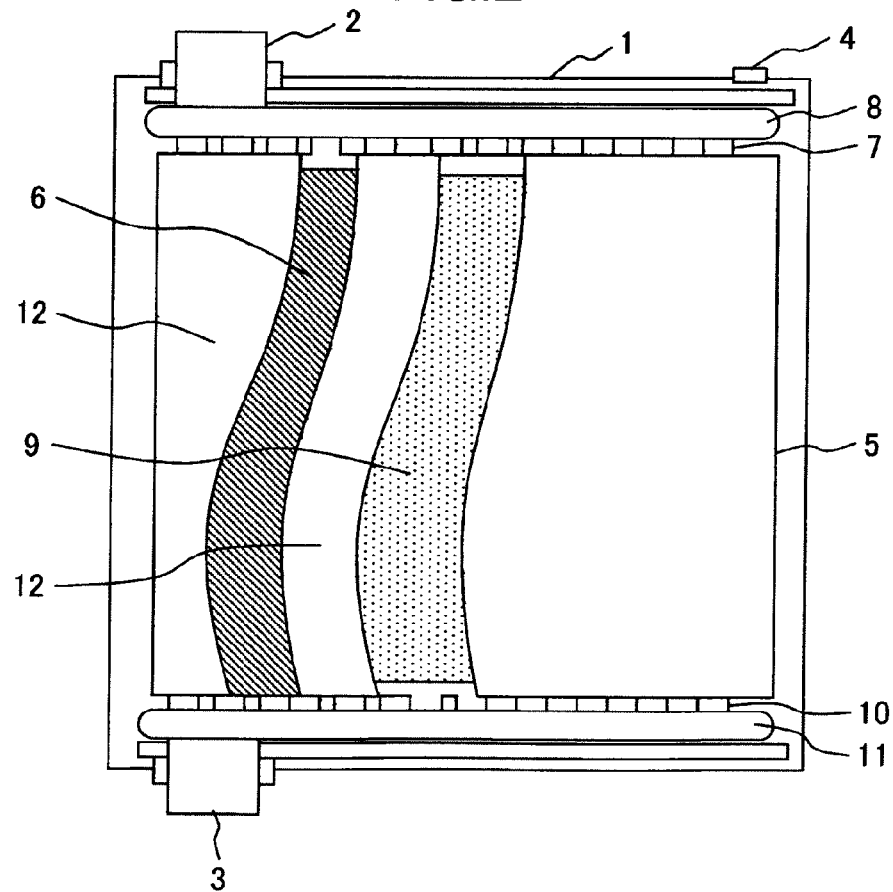
FIG. 2 is a view illustrating one example of an internal structure of the nonaqueous-electrolyte battery.

A nonaqueous-electrolyte battery illustrated in FIG. 2 was produced by using the positive electrode and negative electrode produced in the above way. FIG. 2 is a view illustrating one example of an internal structure of the nonaqueous-electrolyte battery.

A positive electrode 9 and a negative electrode 6 were wound around a shaft core made from a resin through a separator 12 made from polyolefin so that the positive electrode and the negative electrode did not come in contact with each other, and a winding group 5 was produced which is a group of electricity-generation elements. At this time, the power collecting portion 10 of the positive electrode and the power collecting portion 7 of the negative electrode were positioned on both end faces, respectively on the opposite sides of the winding group 5.

The power collecting portion 10 of the positive electrode was ultrasonic-welded to a collector 11 of the positive electrode, and the power collecting portion 7 of the negative electrode was ultrasonic-welded to a collector 8 of the negative electrode, respectively. After that, the whole peripheral surface of the winding group 5 was covered with an insulating material, and the winding group 5 was inserted into a battery case 1.

A terminal 3 of the positive electrode and a terminal 2 of the negative electrode are welded to the collector 11 of the positive electrode and the collector 8 of the negative electrode beforehand for electrical connection, respectively. A lid was fixed on the battery case 1 with a mounting nut through a sealing material, and the battery case 1 and the lid were welded to each other to seal the battery case 1. The terminal 3 of the positive electrode and the terminal 2 of the negative electrode were made so as to protrude from the respective end faces on opposite sides to each other of the battery case 1 so that the output was easily taken out therefrom. Incidentally, a liquid injection port 4 is attached on the lid which is used on a negative electrode side.

Figure 3:
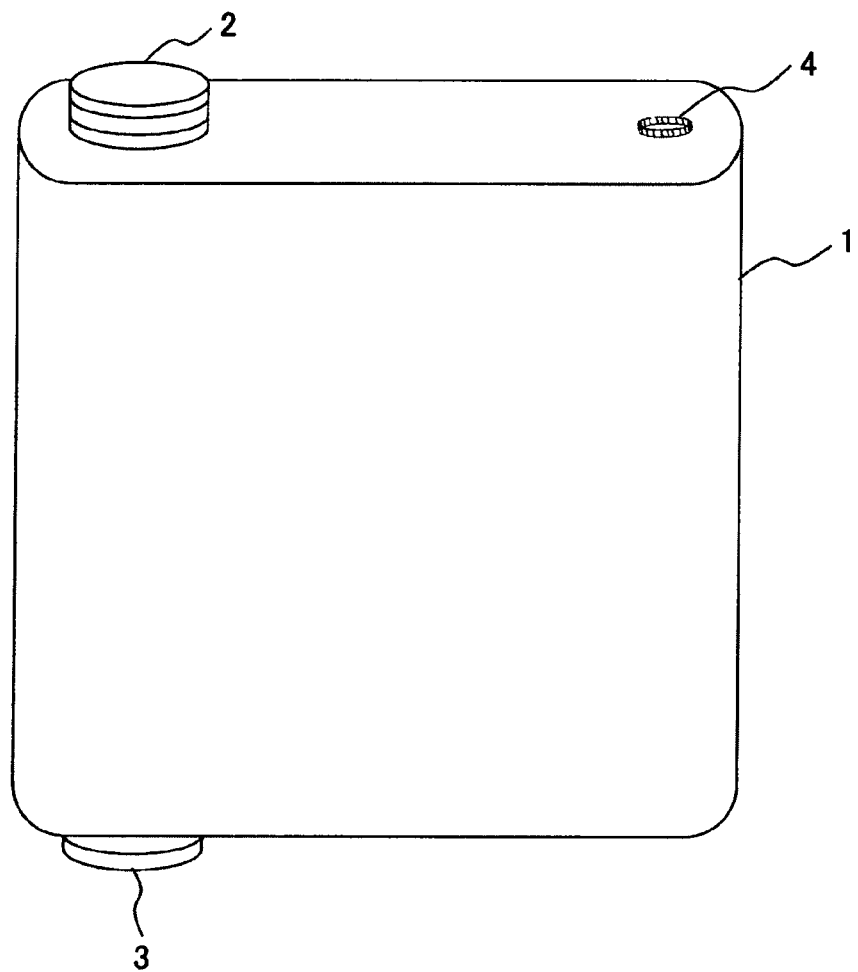
FIG. 3 is a view illustrating one example of an appearance of the nonaqueous-electrolyte battery.

After that, a nonaqueous electrolyte was injected into the battery case 1 from the liquid injection port 4, and the liquid injection port 4 was sealed. The liquid was used as the nonaqueous electrolyte, which contains 1 mol/l of lithium hexafluorophosphate (LiPF$_6$) dissolved as an electrolyte in a solvent that is a mixture of ethylene carbonate (EC), dimethyl carbonate (DMC) and diethyl carbonate (DEC) mixed at a volume ratio of 1:1:1. The appearance of the nonaqueous-electrolyte battery (sealed type lithium ion battery) produced in the above way is illustrated in FIG. 3.

The initial performances of discharge capacity and output density were determined for the nonaqueous-electrolyte battery. The nonaqueous-electrolyte battery was subjected to a charge/discharge operation of 3 cycles in a range of 4.2 to 2.5 V in an atmosphere of 25° C., and then to the measurement of discharge capacity at a 1C rate. In addition, the output density of the battery was obtained by measuring voltages indicated at 10 seconds after the discharge and the charge while changing the electric current, with reference to "method for testing the output density and input density of sealed type nickel-hydrogen batteries for hybrid electric vehicles" in JEVSD713 (2003). The output density was determined from a current value obtained by extrapolating a direct-current internal resistance to 2.5 V at SOC (State Of Charge) of 50%, from the gradient of a plot of voltage to current obtained in the measurement.

After that, the nonaqueous-electrolyte batteries were subjected to a preservation test for determining the maintenance factors thereof. In the preservation test, the nonaqueous-electrolyte battery was charged to 4.1 V (the state of 90% SOC) at the 1C rate, and then was preserved in an atmosphere of 50° C. for three months. After that, the capacity maintenance factor and the output maintenance factor with respect to the values of the initial performances were obtained, by returning the atmosphere to the atmosphere of 25° C., discharging the nonaqueous-electrolyte battery at the 1C rate, then subjecting the nonaqueous-electrolyte battery to a charge/discharge operation of 3 cycles, and then determining the discharge capacity and the output density at the 1C rate in a similar way to the time when the initial performance was determined.

Table 2 shows the discharge capacity and the output density which are the initial performances, and the capacity maintenance factor and the output maintenance factor which were determined by the preservation test. Examples A to C and Comparative Examples 1 and 2 in Table 2 correspond to Examples A to C and Comparative Examples 1 and 2 in Table 1, respectively. Specifically, Examples A to C in Table 2 are nonaqueous-electrolyte batteries which were produced as examples, and Comparative Examples 1 and 2 are nonaqueous-electrolyte batteries which were produced as comparative examples.

TABLE 2

Initial performance and maintenance factor determined by preservation test

| | Discharge capacity (Ah) | Output density (W/kg) | Capacity maintenance factor (%) | Output maintenance factor (%) |
|---|---|---|---|---|
| Example A | 14.1 | 2,600 | 90 | 80 |
| Example B | 14.1 | 2,700 | 93 | 83 |
| Example C | 14.1 | 2,800 | 94 | 84 |
| Comparative Example 1 | 14.0 | 2,000 | 92 | 83 |
| Comparative Example 2 | 14.1 | 2,400 | 82 | 63 |

It was found from Table 1 and Table 2 that the output density showed a high value of 2,600 W/kg or more when the edge/surface ratio of the graphite used in the negative electrode material is 0.03 or more, as in Examples A to C. It was also found that when the specific surface area of the graphite is large, the capacity maintenance factor and the output maintenance factor after the preservation test became small and the life performance degraded. The specific surface area is preferably 9 m$^2$/g or less in which the capacity maintenance factor is 90% or more and the output maintenance factor is 80% or more. However, when the specific surface area is too small, the output of the battery degrades. Accordingly, the specific surface area is more preferably 0.1 to 9 m$^2$/g.

Incidentally, in the present embodiment, the jet mill was used as a method of pulverizing the graphite used in the negative electrode material (active material of negative electrode), but in addition to this, an impact type pulverizer, a collision type pulverizer, a grinding type pulverizer and the like can be used. A ball mill, a hammer mill, an attrition mill, an atomizer mill, a mill with a planet gear and the like can also be used. In addition, graphite may be solely used as the negative electrode material to be used in the nonaqueous-electrolyte battery, as has been described in the above described example, and also can be used in combination with another negative electrode material.

The positive electrode material, the separator and the electrolyte are not limited to the illustrated material, but an arbitrary material according to a required specification can be used.

A high capacity material such as $Li_aNi_xMn_yM_zO_2$ (0<a<1.1, x>0.5, (x+y)>0.55, z>0.05, and M is one or more elements selected from the group consisting of Co, Al, Ti, Mg, W, B, Zr, Mo and V) is particularly preferable as a material of the active material of the positive electrode. The reason is because when the positive electrode which employs such a high capacity material is combined with the negative electrode that employs graphite having the edge/surface ratio of 0.03 to 0.1, the characteristics of the negative electrode can be sufficiently drawn such that the output density is enhanced, a nonaqueous-electrolyte battery having the higher rate of charge/discharge performance is obtained, and the effect of the example becomes larger.

A separator made from polyethylene or polypropylene can be used solely or in combination with the other as the separator. Furthermore, a material to which various ceramics or a heat-resistant substance are added can be used.

Not only the above described electrolysis solution (liquid electrolyte) but also a solid electrolyte, an ion liquid or the like can be used for the electrolyte. Examples of the solid electrolyte include: an organic polymer-based substance such as polyethylene oxide (PEO), polyacrylonitrile (PAN), polymethylmethacrylate (PMMA); a crystal-based inorganic substance such as silicon and thiosilicon; and a glass-based inorganic substance such as $Li_2S$. When the lithium salt is used as the electrolyte, $LiPF_6$, $LiBF_4$, $LiAsF_6$, $LiSbF_6$, $LiClO_4$, $Li(C_2F_5SO_2)_2N$, $LiN(SO_2CF_3)_2$, $Li(SO_3C_2F_5)$, lithium bis-oxalato-borate (LiBOB) and the like can be used. A cyclic carbonate such as EC, a chain carbonate such as DMC and the like can be used for the solvent. The electrolyte and the solvent can be used while being appropriately combined with the above described substances according to a required performance. In addition, the electrolyte and the solvent to which vinylene carbonate (VC), vinyl ethyl carbonate (VEC), cyclohexylbenzene (CHB), biphenyl (BP) and the like are added can also be used.

REFERENCE SIGNS LIST

1 ... battery case, 2 ... terminal of negative electrode, 3 ... terminal of positive electrode, 4 ... liquid injection port, 5 ... winding group, 6 ... negative electrode, 7 ... power collecting portion of negative electrode, 8 ... collector of negative electrode, 9 ... positive electrode, 10 ... power collecting portion of positive electrode, 11 ... collector of positive electrode, 12 ... separator

The invention claimed is:

1. A nonaqueous-electrolyte battery in which a group of electricity-generation elements having a positive electrode, a negative electrode, and a separator that isolates the positive electrode and negative electrode, and a nonaqueous electrolyte are sealed inside a battery case, wherein
the negative electrode contains graphite having an edge/surface ratio (fe) of 0.03 to 0.056, which is defined by the following equation (in the equation, B represents a mean grain diameter of the graphite, T represents a grain thickness, La represents an a-axis crystallite size, d002 represents a spacing between (002) planes, and d100 represents a spacing between (100) planes):

$$fe=(2B/La+T/d002)/(2B/d100+T/d002),$$

wherein the graphite has a specific surface area of 0.1 to 9 m2/g and the mean grain diameter of 0.1 to 30 μm.

2. The nonaqueous-electrolyte battery according to claim 1, wherein the positive electrode contains $Li_aNi_xMn_yM_zO_2$ (0<a<1.1, x>0.5, (x+y)>0.55, z>0.05, and M is one or more elements selected from a group consisting of Co, Al, Ti, Mg, W, B, Zr, Mo and V).

* * * * *